United States Patent [19]

Graefenhain

[11] Patent Number: 5,588,769
[45] Date of Patent: Dec. 31, 1996

[54] CONNECTIBLE LOCKING MECHANISM

[75] Inventor: Paul Graefenhain, Heerbrugg, Switzerland

[73] Assignee: Leica AG, Heerbrugg, Switzerland

[21] Appl. No.: 536,172

[22] Filed: Sep. 29, 1995

[30]   Foreign Application Priority Data

Sep. 30, 1994 [DE] Germany ............... 44 34 997.1

[51] Int. Cl.⁶ ................ G05G 5/06; G02B 21/24; G02B 15/00
[52] U.S. Cl. ................ 403/322; 403/321; 359/392
[58] Field of Search .................. 359/379, 380, 359/392, 406, 694, 706, 702; 403/103, 92, 93, 94, 321, 322

[56]       References Cited

U.S. PATENT DOCUMENTS

| | | | |
|---|---|---|---|
| 2,501,581 | 3/1950 | Rieger | 403/103 X |
| 3,570,325 | 3/1971 | Kroll et al. | 403/103 X |
| 3,583,734 | 6/1971 | Magi | 403/103 X |
| 4,968,118 | 11/1990 | Maki et al. | 359/392 X |

OTHER PUBLICATIONS

M. Pollermann, *Bauelemente der physikalischen Technik*, Springer–Verlag, pp. 94–97 (1955).
O. Richter et al., *Bauelemente der Feinmechanik*, Verlag Technik Berlin, pp. 270–278 (1954).

*Primary Examiner*—Anthony Knight
*Attorney, Agent, or Firm*—Foley & Lardner

[57]       ABSTRACT

A connectible locking mechanism sets defined magnifications in a continuously operating zoom system of a microscope. The mechanism has a drive unit for setting the zoom, a locking disk fixedly connected to and provided axially on a drive shaft of the drive unit and a disk-shaped locking spring arranged fixedly to an instrument of the microscope. The locking disk has defined grooves arranged side by side. Arranged between the locking spring and the locking disk is a ball and a locking slider which is provided with a recess. The ball is positioned in the recess of the locking slider and is movable into and out of engagement with the grooves of the locking disk through a sliding motion of the locking slider.

12 Claims, 1 Drawing Sheet

CONNECTIBLE LOCKING MECHANISM

BACKGROUND OF THE INVENTION

1. Field of the Invention

The invention relates to a connectible locking mechanism for components which are to be moved continuously, and particularly to a connectible locking mechanism for setting magnifications in a continuously operating zoom system of a microscope.

2. Description of the Related Art

Connectible locking mechanisms are used, for example, in microscopes having a continuously operating zoom system. When setting up photographic shots of an object, it is often necessary to set a specific magnification on the microscope. In the case of continuously operating zoom systems, it is difficult to set or reproduce zoom settings precisely. For this reason, known zoom systems have an additional locking mechanism which switches off the continuously operating zoom to allow the magnification setting to be brought into a predetermined defined position.

In the case of stereo microscopes having a zoom system, the locking is carried out by a leaf spring acting radially on a locking disc provided with grooves. In another system, instead of the leaf spring, a compression spring is provided which acts axially on a locking bolt.

In both systems, the switching in and switching out of the locking effect are carried out by means of a rotational movement transmitted to the locking element via a thread.

In another case of a known microscope, the locking device is arranged on the zoom knob, which is designed to be rotationally mobile. Through a locking bolt which is under a spring tension, the locking bolt can be brought into engagement with grooves which are arranged in a star shape and fixed on the frame. The switching in and switching out of the lock is carried out by rotating the locking bolt, in response to which a wedge-shaped element moves the locking bolt through an oblique plane.

Simple embodiments of the locking mechanism are described in "Bauelemente der physikalischen Technik [Components of physical technology], Max Pollermann, Springer Verlag 1955" on page 95 under the heading "5.4. Schalt- und Regelelemente [Switching and control elements]".

All of the known locking devices have the disadvantage that the desired functions are realized only through a complicated mechanism and that ergonomically favorable handling is not guaranteed.

SUMMARY OF THE INVENTION

An object of the present invention is to provide a connectible locking mechanism of a simpler design.

Another object of the present invention is to provide a connectible locking mechanism for a continuously operating zoom system which assures ergonomically favorable handling through the simpler mechanical construction.

The above objects are accomplished with a connectible locking mechanism which includes a drive unit including a drive shaft for setting a zoom, a locking disk, a disk-shaped locking spring, and a locking slider. The locking disk is provided axially on and fixedly connected to the drive shaft; the locking spring is arranged fixedly to an instrument of the microscope; and the locking slider is arranged between the locking spring and the locking disk.

The locking disk has grooves which are arranged side by side and a ball is arranged between any one of these grooves and a cutout formed on the locking spring within a recess formed on the locking slider. The ball is movable into and out of engagement with the grooves of the locking disk through a sliding motion of the locking slider.

In an alternative embodiment, the locking spring is dispensed with and a cutout for receiving the ball is formed directly on a microscope instrument. The locking disk is made of a resilient material, such that the locking disk flexes as the ball moves into and out of engagement with the grooves of the locking disk.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

The invention is explained in more detail using an exemplary embodiment, with the aid of the schematic drawings, in which.

DETAILED DESCRIPTION OF THE PREFERRED EMBODIMENTS

Figure 1:
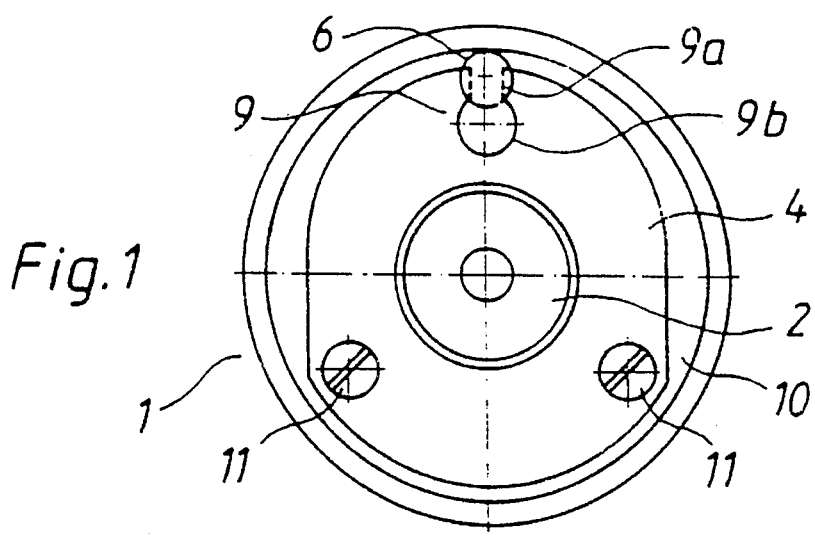
FIG. 1 shows the locking mechanism with its locking spring in a top view.

FIG. 1 is a top view of the locking mechanism 1 with part 10 fixed to a microscope instrument (not shown) and a drive shaft 2 to which there is fastened an operating knob (not shown) for setting the zoom. Through screws 11, a locking spring 4 is arranged in a fixed manner on the part 10 fixed to the instrument. The spring 4 has a cutout 9 to receive a ball 6. The shape of the cutout 9 has a variable design. At the outer boundary of the spring 4, the cutout 9 has the shape of a groove 9a whose width is smaller than the ball diameter, so that in this region the ball 6 runs on the cutout 9 (see FIG. 3). Adjacent to the groove 9a there is a larger circular cutout 9b, whose diameter is dimensioned to be larger than the width of the groove 9a, so that the ball 6 can be accommodated by the circular cutout 9b.

Figure 2:
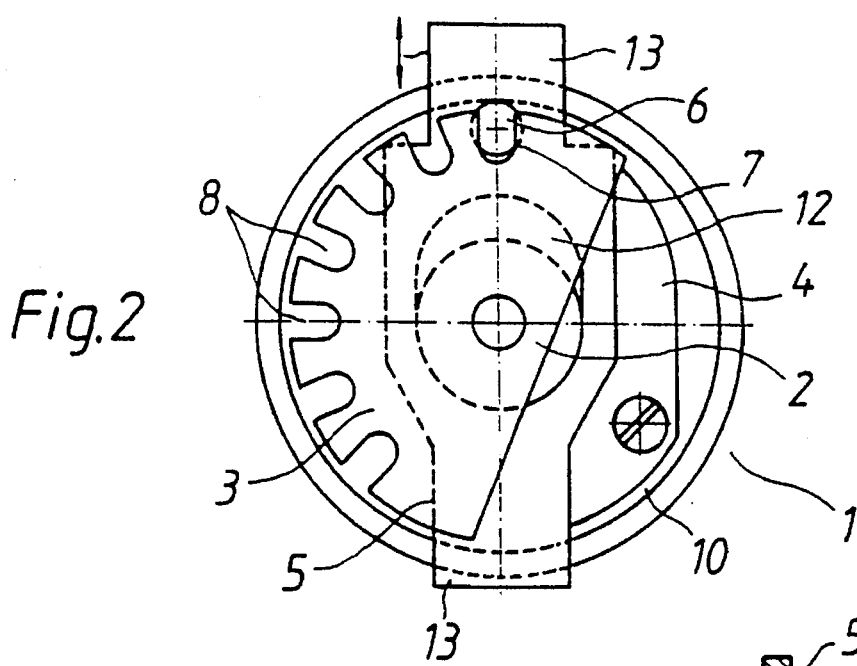
FIG. 2 shows the locking mechanism with its locking spring, slider and locking disk in a top view.

FIG. 2 further shows the locking mechanism 1 in a top view. Starting from the part 10 which is fixed to the instrument, there are arranged above the part 10, the locking spring 4, a locking slider 5, in whose recess 7 the ball 6 is guided, and a locking disk 3. The locking slider 5 has, in the region of the drive shaft 2, a slot 12 and is of such a design that it can be moved in the direction of the double arrow over the slot 12 and the shaft 2. The two tabs 13 are used as handles for moving the locking slider 5.

The locking disk 3 is fixedly connected to the drive shaft 2 to be rotatable therewith. On its outer periphery, the locking disk 3 has a plurality of grooves 8, arranged side by side, to receive the ball 6. The arrangement of the grooves 8 corresponds to a defined zoom setting.

One of the grooves 8 which is located in an effective position is arranged directly above the groove-like portion 9a of the cutout 9. The ball 6 is pressed into one of the grooves 8 in the effective position through the spring action of the locking spring 4 which is arranged fixedly in relation to the instrument. This non-positive/positive connection leads to a perceptible locking of the rotation of the drive shaft 2. Since the grooves 8 are of smaller dimensions than the ball diameter, this non-positive/positive connection can be canceled once more by rotating the drive shaft 2 further, so that a neighboring groove 8 comes into the effective position with the ball 6.

The effect of this locking can be canceled once more by displacing the locking slider 5. The ball 6 is positively guided via the recess 7 in the slider 5, so that the ball 6 is brought from the groove-like section 9a into the round section 9b of the cutout 9 during the movement of the slider 5 in the direction of the double arrow. This section 9b is dimensioned such that it can almost completely accommodate the ball 6 and thus cause the spring action of the locking spring 4 to be virtually canceled. In this case, the distance of the center of the ball from the axis of rotation of the drive shaft is less than the distance of the vertices of the grooves 8 from the axis of rotation. The ball 6 is also no longer in engagement with a corresponding groove 8 of the locking disk 3 and thus the drive shaft 2 can be rotated continuously once more for setting the zoom.

Figure 3:
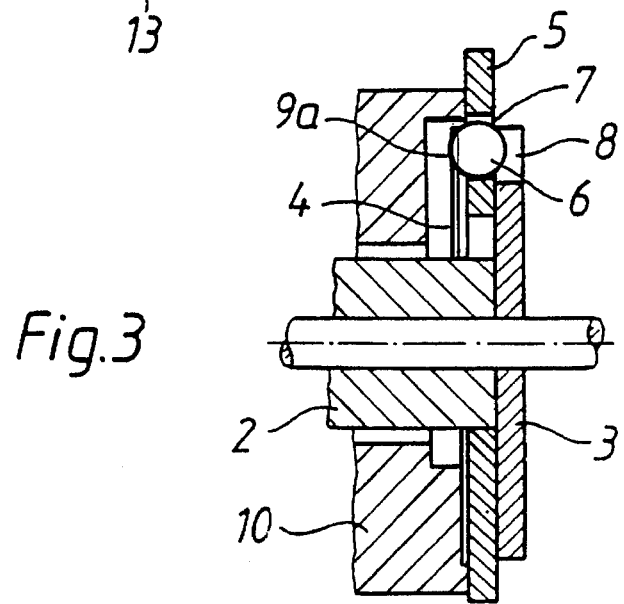
FIG. 3 shows a sectional representation of the locking mechanism.

FIG. 3 shows a section through the locking mechanism 1. In this representation, it becomes clear that the ball 6 is guided in the recess 7 of the slider 5 and that the dimensioning of the groove-like section 9a and of the grooves 8 is significantly smaller than the ball diameter. The ratio of ball diameter to groove size essentially determines the force which must be expended in order to change the locking position through the drive shaft 2.

Apart from its simple construction, the exemplary embodiment of the connectible locking mechanism according to the invention, described above and shown in the drawings, is also distinguished by its very ergonomically favorable arrangement, since the locking slider 5 for "connecting" the defined locking positions may be arranged directly on the operating knob or the drive shaft 2 which is fastened to the operating knob. The slider can be moved using the tabs 13 as a result of simple finger pressure for the purpose of connecting or disconnecting the lock.

It is quite possible to determine the axial position of the ball (and thus the force necessary for its radial displacement) by the different depth of a pair of second grooves continuous with one another, especially if the grooves have a V-shape. In the case of a rectangular profile in the grooves, the effectiveness of the different depths would be obtained only if the ball had some lateral looseness, so that undesired free play can occur. In this case it is more advantageous, as in the two joined cutouts being of different widths for making the width different. In other words, in general, the grooves are different in cross-section (or cross-sectional area) so that the ball can assume different axial positions.

Of course, the invention is not restricted to the exemplary embodiment described and shown in FIGS. 1–3. It is entirely within the scope of the invention to design the locking disk as a resilient element, i.e., made of plastic, hard rubber, leaf spring, etc. and to arrange the cutout directly on a part of the microscope or on a part of the mechanism which is fixed to a microscope instrument, instead of arranging it on the locking spring. In an arrangement of this type, the locking spring can then be dispensed with.

While particular embodiments according to the invention have been illustrated and described above, it will be clear that the invention can take a variety of forms and embodiments within the scope of the appended claims.

What is claimed is:

1. A connectible locking mechanism for a continuously operating zoom system of a microscope, comprising:

a drive unit including a drive shaft for setting a zoom;

a locking disk provided axially on and fixedly connected to the drive shaft, the locking disk defining grooves which are arranged side by side;

a locking spring arranged fixedly to an instrument of said microscope;

a locking slider provided with a recess and arranged between the locking spring and the locking disk; and a ball arranged between the locking spring and the locking disk in the recess of the locking slider, the ball being movable into and out of engagement with the grooves of the locking disk through a sliding motion of the locking slider.

2. The connectible locking mechanism as claimed in claim 1, wherein the locking spring is provided with a cutout, said cutout having a first and second joined cutouts, said joined cutouts being of different widths.

3. The connectible locking mechanism as claimed in claim 2, wherein the cutout of the locking spring has a larger area than any one of the grooves of the locking disk.

4. The connectible locking mechanism as claimed in claim 1, wherein the locking spring is a disk-shaped leaf spring.

5. The connectible locking mechanism as claimed in claim 1, wherein the locking disk is a resilient element.

6. The connectible mechanism for a continuously operating zoom system of a microscope, comprising:

a locking disk provided axially on a drive shaft of said zoom system, said locking disk defining a plurality of first grooves which are arranged side by side and being fixedly connected to the drive shaft;

a locking slider provided with a recess and arranged between the locking disk and a cutout formed on an instrument of said microscope; and a ball arranged between any one of the grooves of the locking disk and the cutout formed on the instrument in the recess of said locking slider.

7. A connectible locking mechanism as claimed in claim 6, wherein the locking disk is resilient.

8. A connectible locking mechanism as claimed in claim 7, wherein the cutout formed on the instrument has a pair of second grooves continuous with one another.

9. A connectible locking mechanism as claimed in claim 8, wherein one of said pair of second grooves has a cross-section different from that of the other.

10. A connectible locking mechanism as claimed in claim 9, wherein one of said pair of second grooves is deeper than the other.

11. A connectible locking mechanism as claimed in claim 10, wherein the deeper groove is located further from the rotation axis of said drive shaft.

12. A connectible locking mechanism as claimed in claim 9, wherein one of said pair of second grooves is wider than the other.

* * * * *